(12) United States Patent
Nielsen et al.

(10) Patent No.: US 10,782,128 B2
(45) Date of Patent: Sep. 22, 2020

(54) METHODS FOR DETECTING A FIBRE MISALIGNMENT IN AN ELONGATED STRUCTURE, RELATED APPARATUSES

(71) Applicant: LM WP PATENT HOLDING A/S, Kolding (DK)

(72) Inventors: Lars Nielsen, Skanderborg (DK); Klavs Jespersen, Kolding (DK)

(73) Assignee: LM WP PATENT HOLDING A/S, Kolding (DK)

( * ) Notice: Subject to any disclaimer, the term of this patent is extended or adjusted under 35 U.S.C. 154(b) by 0 days.

(21) Appl. No.: 16/064,671

(22) PCT Filed: Dec. 19, 2016

(86) PCT No.: PCT/EP2016/081741
§ 371 (c)(1),
(2) Date: Jun. 21, 2018

(87) PCT Pub. No.: WO2017/108689
PCT Pub. Date: Jun. 29, 2017

(65) Prior Publication Data
US 2019/0011254 A1    Jan. 10, 2019

(30) Foreign Application Priority Data

Dec. 23, 2015 (EP) .................................... 15202370

(51) Int. Cl.
*B32B 41/00* (2006.01)
*G01B 15/00* (2006.01)
(Continued)

(52) U.S. Cl.
CPC .............. *G01B 15/00* (2013.01); *B29C 51/14* (2013.01); *B29C 70/30* (2013.01); *B29C 70/54* (2013.01);
(Continued)

(58) Field of Classification Search
CPC ......... G01B 15/00; B29C 70/30; B29C 70/54; B29C 51/14; G01N 23/201;
(Continued)

(56) References Cited

U.S. PATENT DOCUMENTS

2015/0231835 A1    8/2015    Pridie

FOREIGN PATENT DOCUMENTS

WO        2012085401 A1    6/2012

OTHER PUBLICATIONS

Extended European Search Report dated Mar. 31, 2016 corresponding to application No. 15202370.1-1559.

*Primary Examiner* — Michael N Orlando
*Assistant Examiner* — Joshel Rivera
(74) *Attorney, Agent, or Firm* — Nath, Goldberg & Meyer; Jerald L. Meyer; Tanya E. Harkins (57) ABSTRACT

The present disclosure relates to a method for detecting a fibre misalignment in an elongated structure, such as a wind turbine blade component. The elongated structure has a length along a longitudinal direction and comprises a plurality of stacked reinforcing fibre layers. The plurality of fibre layers comprises fibres having an orientation aligned, unidirectionally, substantially in the longitudinal direction. The method comprises scanning the elongated structure along at least a part of the length by emitting an x-ray beam in an angle compared to the orientation of the fibres. The method comprises detecting scattered rays, and determining an intensity of the detected scattered rays. The method comprises estimating a size of the fibre misalignment based on the determined intensity.

15 Claims, 7 Drawing Sheets

(51) Int. Cl.
*G01N 23/201* (2018.01)
*G01N 23/02* (2006.01)
*B29C 51/14* (2006.01)
*G01N 23/205* (2018.01)
*B29C 70/30* (2006.01)
*B29C 70/54* (2006.01)
*B29K 307/04* (2006.01)
*B29K 309/08* (2006.01)

(52) U.S. Cl.
CPC ........... *G01N 23/02* (2013.01); *G01N 23/201* (2013.01); *G01N 23/205* (2013.01); *B29K 2307/04* (2013.01); *B29K 2309/08* (2013.01); *G01N 2223/645* (2013.01)

(58) Field of Classification Search
CPC ........... G01N 2223/645; G01N 23/205; G01N 23/02; B29K 2307/04; B29K 2309/08
USPC ........................... 156/64, 350, 351, 378, 379
See application file for complete search history.

METHODS FOR DETECTING A FIBRE MISALIGNMENT IN AN ELONGATED STRUCTURE, RELATED APPARATUSES

This is a National Phase Application filed under 35 U.S.C. 371 as a national stage of PCT/EP2016/081741, filed Dec. 19, 2016, an application claiming the benefit of European Application No. 15202370.1, filed Dec. 23, 2015, the content of each of which is hereby incorporated by reference in its entirety.

FIELD OF THE INVENTION

The present disclosure pertains to field of composite structures, and more specifically to fibre misalignment in elongated structures. The present disclosure relates to a method for detecting a fibre misalignment in an elongated structure, and related apparatuses.

BACKGROUND OF THE INVENTION

Elongated structures such as wind turbine blades, airplane wings, and vessel hulls can be manufactured using fibre reinforcing material. The fibre reinforcing material is often stacked forming a plurality of stacked layers, while aligning an orientation of the fibres with the longitudinal direction of the elongated structure in order to provide stiffness in the longitudinal direction. Alignment of the stacked fibre layers is of paramount importance for the reliability and strength of the elongated structure. Any fibre misalignment can result in a failure or breakage of the wind turbine blade. Therefore, identifying or locating a fibre misalignment or wrinkle (e.g. in-plane or out of plane misalignments) is essential to remedy the fibre misalignment and thus to ensure reliability of wind turbine blades. Knowing if there is a fibre misalignment defect in the elongated structure and being able to quantify the defect, with its location, allows to engage into appropriate repair work (such as grinding the fibre misalignment away and replacing the grinded parts) and thus eliminates excessive repair work. Furthermore, a fibre misalignment detection provides a higher reliability of the manufactured wind turbine blade, while also providing an enhanced safety.

Today fibre misalignments are detected by inspecting visually on the surface of the elongated structure with a flash light, and are quantified using very simple tools (such as wrinkle comb, and ruler) when a misalignment is observed. Such visual inspection is not sufficient, since it allows only to detect fibre misalignment that are present on the surface of the elongated structure. Fibre misalignments that are not on the surface only, such as deeper fibre misalignment or hidden fibre misalignments are equally detrimental to the reliability of the elongated structure.

Ultrasonic testing methods have not proved sufficiently useful as a method to identify and quantify wrinkles. Ultrasonic testing methods require specific material (which may contaminate surfaces of the blades) to be added for detection of misalignment, in order to provide a contact surface between the sensor and the object under testing. Further, the sensors operate at wavelengths that do not enable appropriate detection or quantification of the wrinkles.

There is, thus, a need for solutions to detection of fibre misalignments that are not on the surface of the elongated structure, do not require additional material, and/or enable further quantification.

SUMMARY OF THE INVENTION

It is an object of the present disclosure to provide a method for detecting fibre misalignment and which overcome or ameliorate at least one of the disadvantages of the prior art or which provide a useful alternative.

The present disclosure relates to a method for detecting a fibre misalignment in an elongated structure, such as a wind turbine blade component. The elongated structure has a length along a longitudinal direction and comprises a plurality of stacked reinforcing fibre layers. The plurality of fibre layers comprises fibres having an orientation aligned, unidirectionally, substantially in the longitudinal direction. The method comprises scanning the elongated structure along at least a part of the length by emitting an x-ray beam in an angle compared to the orientation of the fibres. The method comprises detecting scattered rays, and determining an intensity of the detected scattered rays. The method comprises estimating a size of the fibre misalignment based on the determined intensity.

It is an advantage of the present disclosure that a fibre misalignment below the surface can be detected by x-ray scanning and thus without having to destroy the elongated structure. This leads to savings in terms of repair time and cost. The present disclosure allows detecting and locating the fibre misalignment in the depth of the elongated structure and thus eases the repair work. Once the fibre misalignment is located, the fibre misalignment can be repaired, which results in a clear reduction of such defects in the elongated structure. When the elongated structure is a wind turbine blade, this reduces the likelihood of failures and thus improves significantly reliability of the wind turbine blade. The x-ray scanning has surprisingly be found to be particular useful for detecting misalignments in unidirectional fibre layers as the detected signal will be significantly influenced by the misalignment. Further, x-ray scanning has surprisingly been found to be particular useful for detecting misalignments in fibre layers comprising carbon fibres, which in other scanning methods can be difficult to distinguish from the polymer matrix of a composite structure.

The present disclosure relates to a method of manufacturing an elongated composite structure of a fibre composite material. The fibre composite material comprises reinforcement-fibres embedded in a polymer matrix by use of a mould having a length along a longitudinal direction. The method comprises the steps of i) stacking a plurality of fibre layers in the mould, wherein the plurality of fibre layers comprises fibres having an orientation aligned substantially unidirectionally in the longitudinal direction; ii) supplying liquid resin to the fibre layers, and iii) curing the resin in order to provide the elongated composite structure. The method is characterized by comprises the steps of detecting fibre misalignments by use any of the herein disclosed steps.

The present disclosure relates to a fibre misalignment detection apparatus. The fibre misalignment detection apparatus comprises an x-ray beam emitting module configured to scan an elongated structure along at least a part of the length by emitting an x-ray beam in an angle compared to the longitudinal direction. The fibre misalignment detection apparatus comprises an x-ray detector module configured to detect scattered rays. The fibre misalignment detection apparatus comprises a processing module configured to: determine an intensity of the detected scattered rays; and estimate a size of the fibre misalignment based on the determined intensity.

According to another aspect, the invention provides a fibre reinforcement layer material comprising carbon fibres and a number of tracer yarns made of a second type of material, such as glass fibres. The fibre reinforcement layer material may for instance comprise a plurality of carbon fibre tows and a number of tracer yarns. The tracer yarns may for instance be made of glass fibers, e.g. implemented as a glass fibre roving. The fibre reinforcement layer may comprise mainly unidirectional fibres. Accordingly, the tracer yarn, e.g. the glass fibre roving, may provide a better detection of possible wrinkles in the layup, which normally could not be detected in a pure carbon fibre layup. The contents by volume of fibres of the second type of material may be less than 10%, e.g. less than 7.5%, or even less than 5%. In other words, the carbon fibre contents could also be at least 90%, e.g. at least 92.5%, or even at least 95%.

It is clear that the aforementioned aspects of the invention may be combined in any way and are linked by the common aspect of detecting fibre misalignment in an elongated structure.

It is noted that advantages enunciated with respect to the method of detecting fibre misalignment, apply to the method of manufacturing an elongated composite structure and to the fibre misalignment detection apparatus.

BRIEF DESCRIPTION OF THE FIGURES

Embodiments of the invention will be described in more detail in the following with regard to the accompanying figures. The figures show one way of implementing the present invention and are not to be construed as being limiting to other possible embodiments falling within the scope of the attached claim set.

DETAILED DESCRIPTION OF THE INVENTION

As stated in the background, there is a need for a method for detecting fibre misalignments, such as identifying hidden (below the surface) fibre misalignments in an efficient and non-destructive manner. A simple visual "flash light" based inspection is not destructive but does not permit to identify fibre misalignments under the surface of the elongated structure. An x-ray based inspection allows a detection of fibre misalignments that are not visually detectable in a non-destructive manner. However, x-ray radiation when conventionally used (i.e. high power, e.g. 120 kV or more) provides a full tomography of the inspected object. In this disclosure, detecting whether or not a fibre misalignment is present in the elongated structure is sufficient to carry out a repair work. The present disclosure proposes an unconventional use of an x-ray scanning configured to provide a detection of the misalignment without a full tomography, and optionally a full tomography of the misalignment. The present disclosure thus advantageously provides a non-destructive detection of fibre misalignment by radiating the elongated structure using x-rays, collecting the reflected or scattered rays, identifying the fibre misalignment based on intensity of the reflected or scattered rays.

The invention relates to a method for detecting a fibre misalignment in an elongated structure, such as a wind turbine blade component, an airplane wing, or a vessel hulls. It is clear that the invention is particularly suited for large elongated structures where a non-destructive inspection is highly valued due to the costs occurred by a destructive inspection. Accordingly, the invention preferably relates to wind turbine blades as well as intermediary elongated structures having a total length of at least 30 metres, 40 metres, 45 metres, or 50 metres and a thickness of 1-80 mm. Accordingly, the invention preferably relates to wind turbine blades comprising materials having different densities so that x-ray radiation can reveal misalignments.

Fibre misalignment refers herein to a misalignment between two or more fibre layers, which can represent a deviation from the fibre plane such as an out-of-plane misalignment or a deviation within the fibre plan in transverse manner, such as an in-plane misalignment. In-plane misalignments are theoretically just as severe as the out-of-plane misalignments, but much more unlikely. The in-plane misalignments are reduced and remedied mostly by the construction of the material layer constituting the fibre layers. However, in-plane misalignments don't affect multiple plies as the out-of-plane misalignments do. Examples are fibre misalignments are folds, undulations, wrinkles, crumples.

The elongated structure has a length along a longitudinal direction and comprises a plurality of stacked reinforcing fibre layers. The plurality of stacked reinforcing fibre layers comprises fibres having an orientation aligned unidirectionally and substantially in the longitudinal direction. The longitudinal direction may be defined as the direction along the length of the elongated structure, such as from a root end of the elongated structure towards the tip end of the structure, e.g. towards a tip end of a wind turbine blade. The plurality of fibre layers is (mostly) aligned in one direction that is substantially parallel to the longitudinal direction. Thus the fibre layers are unidirectional substantially in the longitudinal direction. A reinforcing fibre layer may substantially be composed of carbon fibres and/or glass fibres. According to an advantageous embodiment, reinforcing fibre layers comprise at least 25%, or at least 30%, or at least 35%, or at least 40%, or at least 50%, or at least 60%, or at least 70%, or at least 80%, or at least 90% carbon fibres. A reinforcing fibre layer may even be fully constituted by carbon fibres.

The method comprises scanning the elongated structure along at least a part of the length by emitting an x-ray beam in an angle compared to the orientation of the fibres, such as by moving the fibre misalignment detection apparatus along at least a part of the length and emitting the x-ray beam in an angle compared to the orientation of the fibres. For example, the fibre misalignment detection apparatus is moved (e.g. in a translation movement in a longitudinal direction) along at least a part of the length while emitting the x-ray beam in an angle compared to the orientation of the fibres.

The method comprises scanning the elongated structure along at least a part of the length by emitting an x-ray beam in an angle compared to the orientation of the fibres, such as emitting the x-ray beam towards the elongated structure in a pre-determined angle compared to the orientation of the fibres. A detector device is advantageously set up to detect backscattered or reflected x-rays. The angle is for example formed with respect to a plane indicative of the orientation of the fibres, such as a longitudinal plane substantially parallel to the longitudinal direction. The orientation of the fibres may be parallel to a surface of the elongated structure; thus the x-ray beam may be transmitted or directed towards the surface with an angle formed with respect to the surface. When the surface is curved, the x-ray beam may be directed towards the surface with an angle formed with respect to a plane tangent to the surface. Out-of-plane and/or in-plane fibre misalignments may be detected depending on the angle and direction at which the x-rays are emitted towards the elongated structure. For example, for detecting in plane fibre misalignments scanning in an angle compared to a plane substantially orthogonal to the fibre orientation. According to some aspects of this disclosure, the angle is a shallow angle between approx. 0.5 degrees and approx. 45 degrees with respect to a plane of the fibre layers, such as between approx. 0.5 and approx. 20 degrees, such as between approx. 0.5 degrees and approx. 15 degrees with respect to the plane of the fibre layers. It should be noted that the plane of the fibre layers may be curved along the structure, e.g. if the structure is a shell part for a curved or pre-bent wind turbine blade.

In other words, emitting an x-ray beam involves radiating the elongated structure with x-ray beams or exposing the elongated structure to x-ray radiation. The x-ray beam is generated by an x-ray emitting source, e.g. an x-ray tube or an x-ray generator, which is configured to emit x-ray beams at a wavelength ranging from 0.01 to 10 nanometres, or a frequency ranging from 30 petaHertz to 30 exaHertz, or an energy level in the range of 100 eV to 150 keV. According to one or more advantageous embodiments, x-ray beam is emitted at an energy level in the range of 5 keV-120 keV. The x-ray emitting source may be operating at 5-120 keV and 25-100 μA.

The method comprises detecting scattered rays, such as rays scattered through the elongated structure and reflected by the elongated structure. For example, an x-ray emitting source projects an x-ray beam towards the elongated structure. The x-ray beam is scattered: some of the x-ray beam passes through the elongated structure, some is reflected while some is absorbed. The resulting pattern of the scanning (and the radiation) is then ultimately detected by a detection medium such as an x-ray detector module or a backscatter detection module. Stated differently, detecting scattered rays comprise detecting reflected rays and/or rays passing through. The resulting pattern of the scanning depends on the material properties of the elongated structure, such as density. For example, when the elongated structure comprises resin and a plurality of stacked reinforcing fibre layers made of carbon fibre and glass fibres, the x-rays scatter (e.g. reflects, passes through, absorbs) through resin (e.g. a polyester matrix or a vinyl ester matrix) and carbon fibres, differently than through glass fibres due to differences in electron density, and thus detecting the scattered rays provides a distinction between carbon fibres and glass fibres as glass has a different density than carbon. A misalignment of glass fibres is thereby detectable according to this disclosure and thus reveals a fibre misalignment of any of the fibres within the stacked reinforced fibre layers.

The method comprises determining an intensity of the detected scattered rays. Stated differently, the method comprises measuring the intensity of the detected scattered rays, such as energy reflected by the rays, expressed in e.g. electron-volts, such as a magnitude or level of the reflected ray.

The method comprises estimating a size of the fibre misalignment based on the determined intensity. In other words, the method comprises determining whether a fibre misalignment to be repaired is present in the elongated structure, e.g. a non-negligible fibre misalignment is present in the elongated structure. According to some aspects of this disclosure, the step of estimating a size of the fibre misalignment based on the determined intensity comprises estimating a size of an out of plane fibre misalignment. A size of the fibre misalignment refers herein to a quantifying metric characterizing the misalignment, such as a height of the misalignment, a deviation angle of the misalignment with respect to the aligned fibres, and/or a location of the misalignment in the thickness of the elongated structure. According to some aspects of this disclosure, the step of estimating the size of the fibre misalignment based on the determined intensity comprises determining whether the determined intensity is above an intensity threshold, and when it is determined that the determined intensity is above an intensity threshold, then the fibre misalignment for repair is detected. When it is not determined that the determined intensity is above an intensity threshold, the fibre misalignment is considered negligible or inexistent. For example, when the determined intensity or the intensity difference in terms of photon counts is above a threshold showing a non-negligible deviation, the fibre misalignment is detected, and located for repair. According to some aspects of this disclosure, the method further comprises locating the fibre misalignment within the elongated structure so as to enable repair. Locating the fibre misalignment comprises for example determining at which depth (e.g. mm or number of layers/plies) from the surface the fibre misalignment is located, and/or locating a position of the fibre misalignment in the length of the elongated structured, such as distance from two edges of the elongated structured. The x-ray radiation depends on the number of x-ray detector modules involves, the exposure time (i.e. time spent on radiating a given surface), and the energy level of the radiation. It may thus be envisaged that the elongated structured is first radiated or scanned with a low energy level (e.g. 80 keV) over a shorter time period (e.g. 1 h for the entire elongated structure) to reveal misalignments of a certain size (e.g. 3 degrees) and is then radiated or scanned with a higher energy level (e.g. 120 keV) over a longer time period (e.g. more than 1 h for the entire elongated structure) to further characterise the depth, and size of the same misalignments. The higher energy level may not exceed a certain level above which safety regulations are not complied with.

According to some aspects of this disclosure, the step of estimating the size of the fibre misalignment based on the determined intensity comprises determining whether the determined intensity substantially matches a pre-determined intensity level corresponding to a type of fibre misalignment, and when it is determined that the determined intensity is matches substantially a pre-determined intensity level, then categorizing the fibre misalignment in the corresponding type. A type of fibre misalignment is characterized for example by its size that is detectable using a characterizing energy level (or energy range) and exposure time (or exposure time range). When it is not determined that the determined intensity substantially matches a pre-determined intensity level corresponding to a type of fibre misalignment, the fibre misalignment is not categorized and is probably negligible. The pre-determined intensity level comprises a signature characterizing a fibre misalignment in terms of angle, depth, geometry number of plies, a partial tomography etc . . . .

According to some aspects of this disclosure, the step of emitting the x-ray beam in the angle comprises emitting the x-ray beam through a collimator and/or emitting the x-ray beam with low power, such as 60 kW or less. For example, emitting the x-ray beam through a collimator involves emitting the x-ray beam along an area, a line and/or a plane defined by the collimator in order to narrow the beam, i.e. to cause direction of the beams to be more and more aligned towards a same direction. Thereby, the fibre layers are radiated along a well-defined line and plane, whereby the location of a possible fibre misalignment may be determined. The scattered signal may for instance be detected via a detector device having a pinhole, whereby x-rays scattered from a well-defined position will be emitted to a particular detector.

Emitting the x-ray beam with a lowered power comprises emitting the x-ray beam at a power equal or less than 60 kW, such as less than 40 kW, such as less than 10 kW, such as 5 kW. This allows to limit the x-ray radiation to a local area and thus renders the solution disclosed herein applicable with a proper shield or protection to reduce absorption by body tissue in the vicinity.

According to some aspects of this disclosure, the method further comprises scanning the elongated structure along at least a part of the length by emitting an additional x-ray beam in an additional angle. The additional x-ray beam may for instance be directed in a reverse direction of a first x-ray beam (e.g. at an additional angle of 180-α, α being the first angle). This has the advantage that the detecting method may simultaneously detect both positive and negative angles out-of-plane misalignments or undulations. It is of course also possible to carry out the scan in two steps by first carrying out a scan with the x-ray beam oriented in a first angle, and later carrying out a second scan with the x-ray beam oriented in a second angle, e.g. a reverse angle of the first angle. Additionally, or alternatively, the method further comprises scanning the elongated structure along at least a part of its length by emitting a second signal signal/ray at a plurality of angles so as to obtain a 3D representation of the fibre misalignment.

In one or more embodiments of the present disclosure, the step of scanning and/or the step of estimating takes place before and/or after an infusion phase before and/or after a curing phase. The infusion phase corresponds to a phase where resin is infused on fibre layers forming the elongated structure. The curing phase corresponds to a phase after infusion, where the infused fibre layers harden.

In one or more embodiments of the present disclosure, the plurality of stacked reinforcing fibre layers comprises carbon fibre layers, or carbon fibre layers and glass fibre layers. When the plurality of stacked reinforcing fibre layers comprises carbon fibre layers and glass fibre layers, estimating the size of the fibre misalignment comprises estimating the size of glass fibre misalignment. As carbon fibre layers are not easy to distinguish from resin after infusion by x-ray radiation and the carbon fibre layers are aligned with glass fibre layers, glass fibres are one of the medium that can then help in estimating the size of the fibre misalignment of any kind.

In one or more embodiments of the present disclosure, the plurality of stacked reinforcing fibre layers comprises carbon fibre layers with a tracer yarn. For example, in parts of the elongated structures that are made of carbon and resin, the x-ray scanning does not permit to identify misalignments. However, a tracer yarn incorporated in the plurality of stacked reinforcing fibre layers enables detecting and estimating the misalignments. The tracer yarn may be made of any of material having a density substantially different than the density of the carbon or resin. For example, the tracer yarn may comprise glass. The tracer yarn may have a diameter that matches a diameter of a carbon fibre.

In one or more embodiments of the present disclosure, the plurality of stacked reinforcing fibre layers comprises one to 80 layers, such as up to 60 layers, such as up to 30 layers. The plurality of stacked reinforcing fibre layers may have a total thickness of 1 to 80 mm, such as 1 to 60 mm, such as 1 to 30 mm.

According to some advantageous aspects, the elongated structure is a wind turbine blade component. The wind turbine blade component is a load-carrying structure, such as a main laminate or a spar cap of the wind turbine blade.

In one or more embodiments of the present disclosure, the method comprises storing scans of the elongated structure in relation to a position (of the scanned fibre layers or the x-ray system) in order to provide an overall picture of the elongated structure and possible locations of fibre misalignments.

The present disclosure relates to a method of manufacturing an elongated composite structure of a fibre composite material. The fibre composite material comprises reinforcement-fibres embedded in a polymer matrix by use of a mould having a length along a longitudinal direction. The method comprises the steps of i) stacking a plurality of fibre layers in the mould, wherein the plurality of fibre layers comprises fibres having an orientation aligned substantially unidirectionally in the longitudinal direction; ii) supplying liquid resin to the fibre layers, and iii) curing the resin in order to provide the elongated composite structure. The method is characterized by comprises the steps of detecting fibre misalignments by use any of the herein disclosed steps.

The present disclosure relates to a fibre misalignment detection apparatus. The fibre misalignment detection apparatus comprises an x-ray beam emitting module configured to scan an elongated structure along at least a part of the length by emitting an x-ray beam in an angle compared to the longitudinal direction. The x-ray beam emitting module is for example an x-ray generator module capable of transmitting x-ray beams or signals through the elongated structure at a given angle, e.g. by using a collimator or a slit. The x-ray beam emitting module is for example configured to receive or derive an angle to be used for transmitting the x-ray beams, and to adjust the emission of the x-ray beams according to the received or derived angle, such as to adjust the collimator of the x-ray emitting module or the slit of the x-ray emitting module accordingly. The collimator supports in targeting a focus point so that an x-ray detector module is able to detect or receive scattered rays.

The fibre misalignment detection apparatus comprises an x-ray detector module configured to detect scattered rays.

The fibre misalignment detection apparatus comprises a processing module configured to: determine an intensity of the detected scattered rays; and estimate a size of the fibre misalignment based on the determined intensity. The processing module comprises for example an intensity determiner module configured to determine the intensity of the detected scattered rays and an estimator module configured to estimate a size of the fibre misalignment based on the determined intensity.

In one or more embodiments of the fibre misalignment detection apparatus, the x-ray beam emitting module comprises a collimator, and the x-ray beam emitting module is configured to scan an elongated structure along at least a part of the length by emitting an x-ray beam in an angle compared to the longitudinal direction through the collimator.

The fibre misalignment detection apparatus is configured to move along at least a part of a length of an elongated in a longitudinal direction while emitting an x-ray beam in an angle compared to the longitudinal direction through the collimator.

Figure 1:
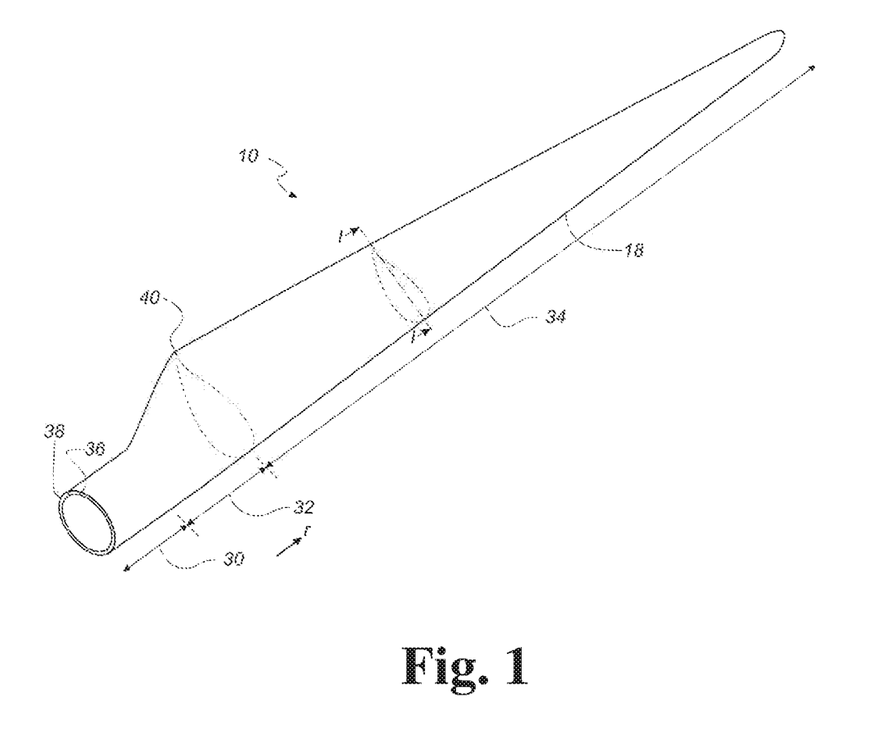
FIG. 1 is a schematic diagram illustrating an exemplary wind turbine blade according to some aspects of the invention.

FIG. 1 shows a schematic view of a wind turbine blade 10. The wind turbine blade 10 has the shape of a conventional wind turbine blade and comprises a root region 30 closest to a hub of a wind turbine, a profiled or an airfoil region 34 farthest away from the hub and a transition region 32 between the root region 30 and the airfoil region 34. The blade 10 comprises a leading edge 18 facing the direction of rotation of the blade 10, when the blade is mounted on the hub, and a trailing edge facing the opposite direction of the leading edge 18. The wind turbine blade 10 has a length along a longitudinal direction of the blade, indicated by the arrow illustrating distance r.

The airfoil region 34 (also called the profiled region) has an ideal or almost ideal blade shape with respect to generating lift, whereas the root region 30 due to structural considerations has a substantially circular or elliptical cross-section, which for instance makes it easier and safer to mount the blade 10 to the hub. The diameter (or the chord) of the root region 30 may be constant along the entire root area 30. The transition region 32 has a transitional profile gradually changing from the circular or elliptical shape of the root region 30 to the airfoil profile of the airfoil region 34. The chord length of the transition region 32 typically increases with increasing distance r from the hub. The airfoil region 34 has an airfoil profile with a chord extending between the leading edge 18 and the trailing edge of the blade 10. The width of the chord of the airfoil region 34 decreases with increasing distance r from the hub.

A shoulder 40 of the blade 10 is defined as the position, where the blade 10 has its largest chord length. The shoulder 40 is typically provided at the boundary between the transition region 32 and the airfoil region 34.

It should be noted that the chords of different sections of the blade normally do not lie in a common plane, since the blade may be twisted and/or curved (i.e. pre-bent), thus providing the chord plane with a correspondingly twisted and/or curved course, this being most often the case in order to compensate for the local velocity of the blade being dependent on the radius from the hub.

The blade is typically made from a pressure side shell part 36 and a suction side shell part 38 that are glued to each other along bond lines at the leading edge 18 and the trailing edge of the blade.

Figure 2:
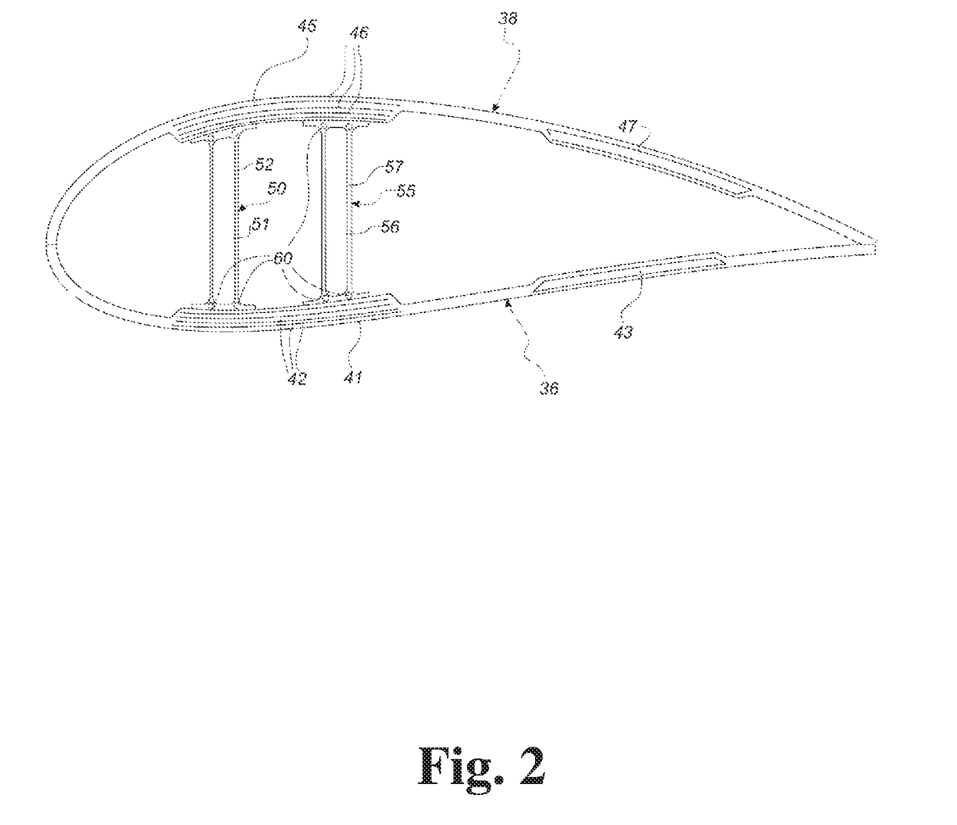
FIG. 2 is a schematic diagram illustrating an exemplary cross-section of a wind turbine blade according to some aspects of the invention.

FIG. 2 shows a schematic view of a cross section of the blade along the line I-I shown in FIG. 1. As previously mentioned, the blade 10 comprises a pressure side shell part 36 and a suction side shell part 38. The pressure side shell part 36 comprises a spar cap 41, also called a main laminate, which constitutes a load bearing part of the pressure side shell part 36. The spar cap or main laminate is an elongated structure, such as an elongated composite structure that may form a load carrying structure of the wind turbine blade. The spar cap 41 comprises a plurality of stacked reinforcing fibre layers 42 mainly comprising unidirectional fibres aligned along the longitudinal direction of the blade in order to provide stiffness to the blade. The suction side shell part 38 also comprises a spar cap 45 (or main laminate corresponding to an elongated structure) comprising a plurality of stacked reinforcing fibre layers 46. The pressure side shell part 38 may also comprise a sandwich core material 43 typically made of balsawood or foamed polymer and sandwiched between a number of fibre-reinforced skin layers. The sandwich core material 43 is used to provide stiffness to the shell in order to ensure that the shell substantially maintains its aerodynamic profile during rotation of the blade. Similarly, the suction side shell part 38 may also comprise a sandwich core material 47.

The spar cap 41 of the pressure side shell part 36 and the spar cap 45 of the suction side shell part 38 are connected via a first shear web 50 and a second shear web 55. The shear webs 50, 55 are in the shown embodiment shaped as substantially I-shaped webs.

The first shear web 50 comprises a shear web body and two web foot flanges. The shear web body comprises a sandwich core material 51, such as balsawood or foamed polymer, covered by a number of skin layers 52 made of a number of fibre layers. The second shear web 55 has a similar design with a shear web body and two web foot flanges, the shear web body comprising a sandwich core material 56 covered by a number of skin layers 57 made of a number of fibre layers. The sandwich core material 51, 56 of the two shear webs 50, 55 may be chamfered near the flanges in order to transfer loads from the webs 50, 55 to the main laminates 41, 45 without the risk of failure and fractures in the joints between the shear web body and web foot flange. However, such a design will normally lead to resin rich areas in the joint areas between the legs and the flanges. Further, such resin rich area may comprise burned resin due to high exothermic peeks during the curing process of the resin, which in turn may lead to mechanical weak points.

In order to compensate for this, a number of filler ropes 60 comprising glass fibres are normally arranged at these joint areas. Further, such ropes 60 will also facilitate transferring loads from the skin layers of the shear web body to the flanges. However, according to the invention, alternative constructional designs are possible.

The blade shells 36, 38 may comprise further fibre-reinforcement at the leading edge and the trailing edge. Typically, the shell parts 36, 38 are bonded to each other via glue flanges in which additional filler ropes may be used (not shown). Additionally, very long blades may comprise sectional parts with additional spar caps, which are connected via one or more additional shear webs.

Figure 3:
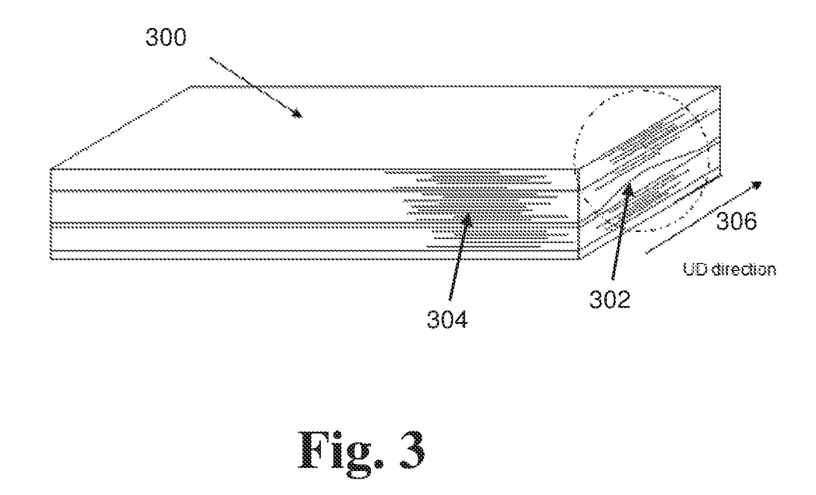
FIGS. 3-4 are schematic diagrams illustrating different views of an exemplary fibre misalignment in an exemplary elongated structure according to some aspects of the invention.
Figure 4:
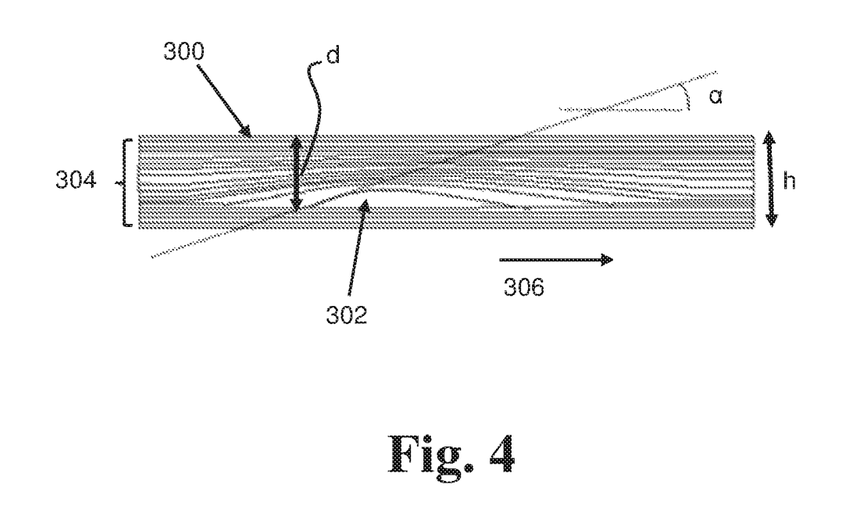

FIGS. 3-4 are schematic diagrams illustrating different views of an exemplary fibre misalignment 302 in an exemplary elongated structure 300 according to some aspects of the invention. FIG. 3 shows a perspective view of the elongated structure 300 that allows visualizing the layer construction of the elongated structure 300, including an occurrence of a fibre misalignment. The exemplary elongated structure 300 comprises a plurality of stacked reinforcing fibre layers 304. The plurality of stacked reinforcing fibre layers 304 are unidirectional and orientated substantially in the longitudinal direction indicated by arrow 306. FIG. 3 illustrates an exemplary out-of-plane fibre misalignment 302 where the fibre misalignment deviates the fibre layer from a fibre plane (defined as a plane formed by most of the same fibre layer) and deforms the neighbouring fibre layers, resulting in a defect of the elongated structure. FIG. 4 shows a cross section view of the exemplary fibre misalignment 302 in the exemplary elongated structure 300. The elongated structure 300 has a thickness denoted h in FIG. 4, which ranges for example from 1 mm to 80 mm or any sub-range in between. The plurality of stacked reinforcing fibre layers 304 form partly or wholly the thickness of the elongated structure at a point of interest. The plurality of stacked reinforcing fibre layers 304 unidirectional substantially in the longitudinal direction indicated by arrow 306. The fibre misalignment 302 causes an angle α of deviation and a deformation incurred on the neighbouring fibre layers. It is advantageous to locate approximately the depth denoted d of the fibre misalignment 302 in terms of distance from the scanned surface, or a number of layers or plies from the scanned surface so as to prepare accordingly for repair. The x-ray scanning disclosed herein allows detection of the fibre misalignment 302 as well as quantification of the size of the fibre misalignment 302 that can be estimated in terms of depth d, angle α, and/or a location (e.g. a length wise position or coordinate with respect to a reference point). Optionally, the method disclosed herein using the x-ray scanning provides a signature of the fibre misalignment 302 that can be estimated in terms of geometry of the fibre misalignment 30, and/or energy absorbed, and/or reflected back by the fibre misalignment 302. For example, exposing the elongated structure to x-rays at different angles allows to identify a match between the angle at which the x-ray beam is emitted (i.e. the emission angle) and the angle α of deviation, i.e. when the emission angle and the deviation angle α are parallel the signal intensity changes significantly.

Figure 5:
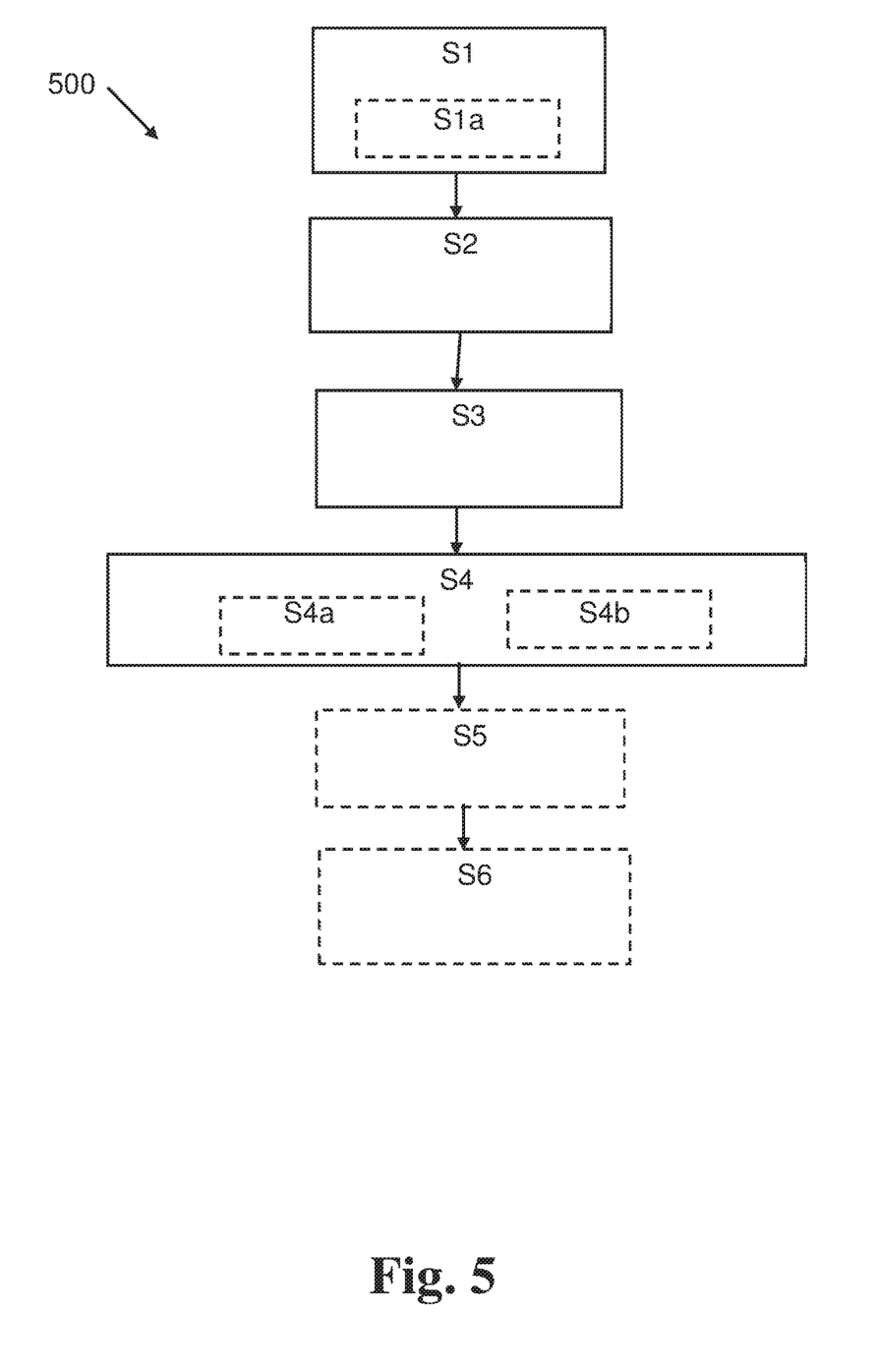
FIG. 5 is a flow-chart illustrating an exemplary method for detecting a fibre misalignment in an elongated structure according to some aspects of the invention.

FIG. 5 is a flow-chart illustrating an exemplary method 500 for detecting a fibre misalignment in an elongated structure according to some aspects of the invention. The method 500 aims at detecting a fibre misalignment in an elongated structure, such as a wind turbine blade component, an airplane wing, or a vessel hulls. The method 500 handles fibre misalignments including an out-of-plane fibre misalignment and an in-plane fibre misalignment. The elongated structure has a length along a longitudinal direction and comprises a plurality of stacked reinforcing fibre layers. The plurality of stacked reinforcing fibre layers comprises fibres having an orientation aligned unidirectionally and substantially in the longitudinal direction.

The method comprises scanning S1 the elongated structure along at least a part of the length by emitting an x-ray beam in an angle compared to the orientation of the fibres. The angle is for example formed with respect to a plane indicative of the orientation of the fibres, such as a longitudinal plane substantially parallel to the longitudinal direction. The orientation of the fibres may be parallel to a surface of the elongated structure; thus the x-ray beam may be transmitted or directed towards the surface with an angle formed with respect to the surface. For example, scanning S1 comprises emitting, by a backscatter x-ray means, the x-ray beam towards the elongated structure in a pre-determined angle compared to the orientation of the fibres. According to some aspects of this disclosure, the angle is a shallow angle between approx. 0.5 degrees and approx. 45 degrees with respect to a plane of the fibre layers, such as between approx. 0.5 and approx. 20 degrees, such as between approx. 0.5 degrees and approx. 15 degrees with respect to the plane of the fibre layers. In other words, scanning S1 involves radiating the elongated structure with x-ray beams at a pre-defined angle or exposing the elongated structure to x-ray radiation at a pre-defined angle while sweeping the elongated structure. According to one or more advantageous embodiments, scanning S1 may comprise generating an x-ray beam using an x-ray emitting source, e.g. an x-ray tube or an x-ray generator, which is configured to emit x-ray at an energy level in the range of 5 keV-120 keV. The x-ray emitting source may be operating at 5-120 keV and 25-100 μA.

The method 500 comprises detecting S2 scattered rays, such as rays scattered through the elongated structure and reflected by the elongated structure. For example, the x-ray beam is scattered: some of the x-ray beam passes through the elongated structure, some is reflected while some is absorbed. Detecting S2 scattered rays may be performed by a detection medium capable of detecting a resulting pattern of the scanning (and the radiation), such as an x-ray detector module or a backscatter detection module. In other words, detecting S2 scattered rays comprises detecting reflected rays and/or rays passing through. Detecting S2 scattered rays comprises for example detecting rays scatter through glass and/or carbon fibres which indicate a misalignment of glass fibres. This allows revealing a fibre misalignment of any other fibres in that location within the stacked reinforced fibre layers.

The method 500 comprises determining S3 an intensity of the detected scattered rays. For example, determining S3 the intensity comprises measuring the intensity of the detected scattered rays, such as energy reflected by the rays, expressed in e.g. electron-volts, such as a magnitude or level of the reflected ray.

The method 500 comprises estimating S4 a size of the fibre misalignment based on the determined intensity. In other words, estimating S4 a size of the fibre misalignment comprises determining whether a fibre misalignment to be repaired is present in the elongated structure, e.g. a non-negligible fibre misalignment is present in the elongated structure. In one or more embodiment, estimating S4 a size of the fibre misalignment amounts to computing a quantifying metric characterizing the misalignment, such as a height of the misalignment, a deviation angle of the misalignment with respect to the aligned fibres, and/or a location of the misalignment in the thickness of the elongated structure. According to some aspects of this disclosure, the step of estimating S4 the size of the fibre misalignment based on the determined intensity comprises determining S4a whether the determined intensity is above an intensity threshold, and when it is determined that the determined intensity is above an intensity threshold, then the fibre misalignment for repair is detected. When it is not determined that the determined intensity is above an intensity threshold, the fibre misalignment is considered negligible or inexistent. In an illustrative example where the present technique is applicable, the intensity threshold relates to photon counting, and particularly to difference, Δ, in photon countings measured, such as deviation in photon countings measured over an area compared to the rest of the elongated structure or a perfectly or ideally aligned elongated structure. When the determined intensity is above the threshold, the fibre misalignment is detected for repair. The method 500 may further proceed to determining the location of the fibre misalignment in the thickness of the stacked fibre layers by comparing the intensity of the scattered rays from aligned fibres just before the misalignment, and the intensity of the scattered rays from misaligned fibres at different angles. According to some aspects of this disclosure, the method 500 further comprises locating S5 the fibre misalignment within the elongated structure so as to enable repair. Locating S5 the fibre misalignment comprises determining at which depth (e.g. mm or number of layers/plies) from the surface the fibre misalignment is located and/or at which position along the length of the elongated structure. Referring to FIG. 4, locating S5 comprises e.g. computing the depth d.

According to some aspects of this disclosure, the step of estimating S4 the size of the fibre misalignment based on the determined intensity comprises determining S4b whether the determined intensity substantially matches a pre-determined intensity level corresponding to a type of fibre misalignment, and when it is determined that the determined intensity is matches substantially a pre-determined intensity level, then categorizing the fibre misalignment in the corresponding type. When it is not determined that the determined intensity substantially matches a pre-determined intensity level corresponding to a type of fibre misalignment, the fibre misalignment is not categorized and is probably negligible or unknown. The pre-determined intensity level comprises a signature characterizing a fibre misalignment in terms of angle, depth, geometry number of plies, a partial tomography etc. In an illustrative example where the disclosed invention is applicable, a pre-determined intensity level of 80 keV indicates a fibre misalignment with 3 degrees.

According to some aspects of this disclosure, the step S1 of scanning by emitting the x-ray beam in the angle comprises emitting S1a the x-ray beam through a collimator and/or emitting the x-ray beam with low power, such as 60 kW or less. For example, emitting the x-ray beam through a collimator involves emitting the x-ray beam along an area, a line and/or a plane defined by the collimator in order to narrow the beam, i.e. to cause direction of the beams to be more and more aligned towards a same direction. Emitting the x-ray beam with a lowered power comprises emitting the x-ray beam at a power equal or less than 60 kW, such as less than 40 kW, such as less than 10 kW, such as 5 kW. This allows to limit the x-ray radiation to a local area and thus renders the solution disclosed herein applicable with a proper shield or protection to reduce absorption by body tissue in the vicinity.

According to some aspects of this disclosure, the method 500 further comprises scanning S6 the elongated structure along at least a part of the length by emitting an additional x-ray beam in an additional angle. For example, S6 may comprise emitting the additional x-ray beam in a reverse direction of a first x-ray beam of step S1 (e.g. at an additional angle of 180-α, α being the first angle used in step S1). This has the advantage that the detecting method 500 may simultaneously detect both positive and negative angled out-of-plane misalignments or undulations. It is of course also possible to carry out the scan in two steps by first carrying out a scan with the x-ray beam oriented in a first angle such as in step S1, and later carrying out a second scan with the x-ray beam oriented in a second angle such as in step S6, e.g. a reverse angle of the first angle. Additionally, or alternatively, the method 500 further comprises scanning the elongated structure I along at least a part of its length by emitting a second signal signal/ray at a plurality of angles so as to obtain a 3D representation of the fibre misalignment or a full tomography of the fibre misalignment.

In one or more embodiments of the present disclosure, the method 500 may comprise integrating a tracer yarn in the plurality of stacked reinforcing fibre layers, and wherein estimating S4 the size of the fibre misalignment comprises estimating a size of tracer yarn misalignment.

Figure 6:
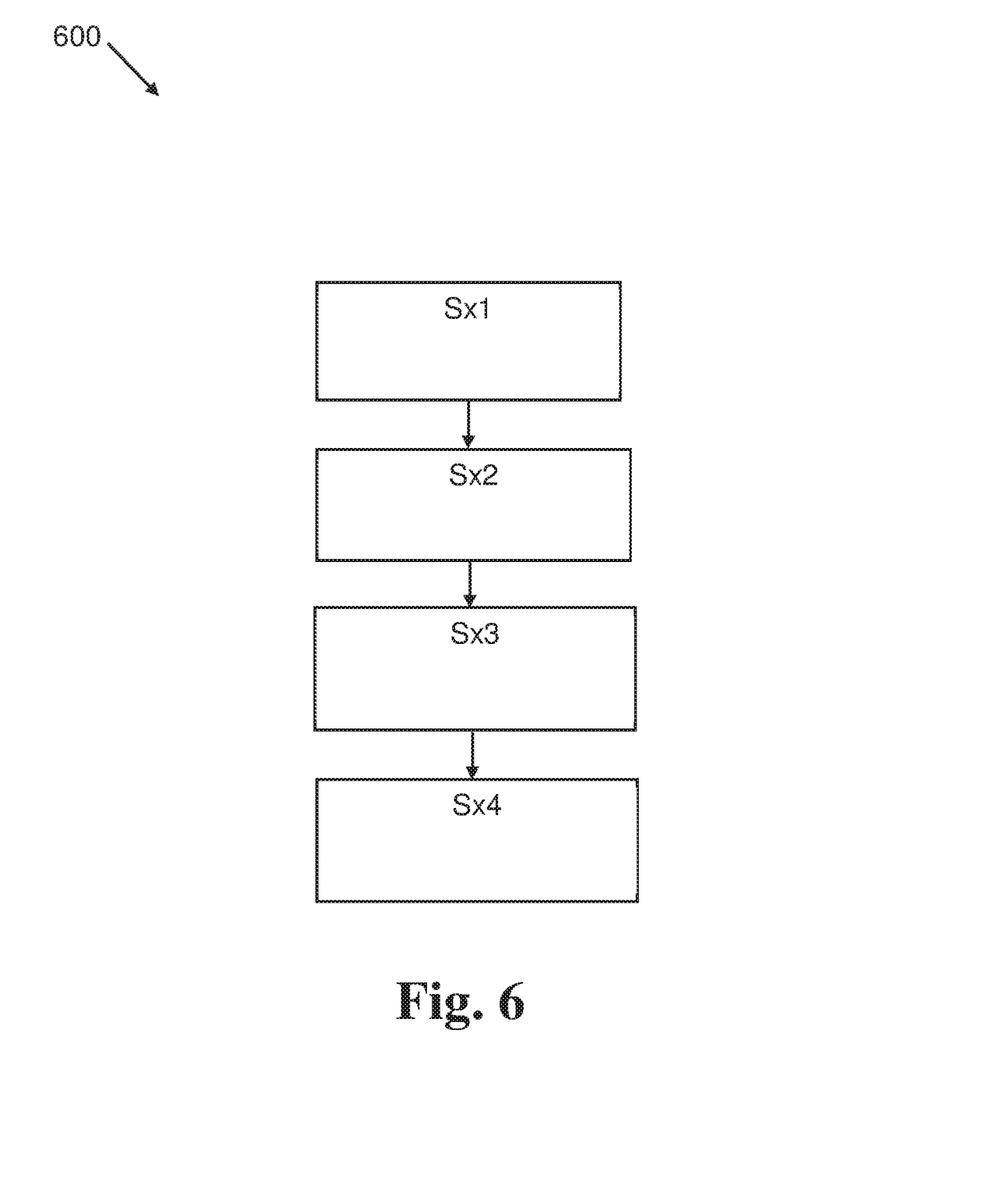
FIG. 6 is a flow-chart illustrating an exemplary method for manufacturing an elongated composite structure according to some aspects of the invention.

FIG. 6 shows a flow-chart illustrating an exemplary method 600 for manufacturing an elongated composite structure according to some aspects of the invention. The method relates to manufacturing an elongated composite structure of a fibre composite material. The fibre composite material comprises reinforcement-fibres embedded in a polymer matrix by use of a mould having a length along a longitudinal direction. The method 600 comprises the steps of:

stacking Sx1 a plurality of fibre layers in the mould, wherein the plurality of fibre layers comprises fibres having an orientation aligned substantially (unidirectional) in the longitudinal direction;
supplying Sx2 liquid resin to the fibre layers, and
curing Sx3 the resin in order to provide the elongated composite structure.

The method 600 advantageously further comprises detecting Sx4 fibre misalignments by use any of the steps of method 500.

In one or more embodiments of the present disclosure, the step of scanning S1 and/or the step of estimating S4 of method 500 takes place before and/or after the step of supplying Sx2 resin, or before and/or after the step of curing Sx3.

Figure 7:
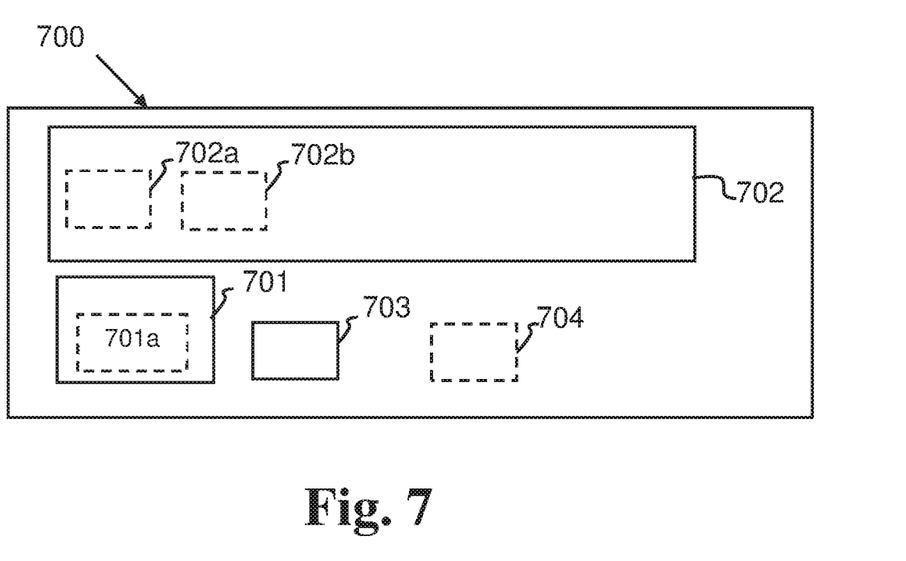
FIG. 7 is a block diagram illustrating an exemplary fibre misalignment detection apparatus according to some aspects of the invention.

FIG. 7 shows a block diagram illustrating an exemplary fibre misalignment detection apparatus 700 according to some aspects of the invention. The fibre misalignment detection apparatus 700 comprises an x-ray beam emitting module 701 configured to scan an elongated structure along at least a part of the length by emitting an x-ray beam in an angle compared to the longitudinal direction. The x-ray beam emitting module 701 is for example an x-ray tube or an x-ray generator module capable of transmitting of x-ray beams or signals through the elongated structure. The x-ray beam emitting module 701 is for example configured to emit x-ray beams at an energy level in the range of 5 keV-120 keV. The x-ray emitting source may be operating at 40-100 μA. In one or more embodiments, the x-ray beam emitting module 701 comprises a collimator 701a, and the x-ray beam emitting module 701 is configured to scan an elongated structure along at least a part of the length by emitting an x-ray beam in an angle compared to the longitudinal direction through the collimator 701a, e.g. at an angle compared to the line or plane formed by the collimator 701a. The collimator 701a may be a slit collimator.

The fibre misalignment detection apparatus 700 comprises an x-ray detector module 703 configured to detect scattered rays. The x-ray detector module 703 may comprise a detection medium capable of detecting a resulting pattern of the scanning (and the radiation), such as a forward-scatter and/or a backscatter detection module.

The fibre misalignment detection apparatus 700 comprises a processing module 702 configured to: determine an intensity of the detected scattered rays; and estimate a size of the fibre misalignment based on the determined intensity. The processing module 702 comprises for example an intensity determiner module 702a configured to determine the intensity of the detected scattered rays and an estimator module 702b configured to estimate a size of the fibre misalignment based on the determined intensity. The fibre misalignment detection apparatus 700 may further comprise an interface module configured to receive and transmit fibre misalignment information and a memory module configured to store fibre misalignment information and/or scans in relation to a position (of the scanned fibre layers or the x-ray system) in order to provide an overall picture of the blade and possible locations of fibre misalignments. The fibre misalignment information can then be compiled by the processing module 702 to generate a report or map of where fibre misalignments above a certain threshold are mapped against requirements for the elongated structure. When the elongated structure is a wind turbine blade, then fibre misalignments above a certain threshold are mapped against acceptance criteria with respect to the misalignment size vs. strain level. It may be envisaged that a critical size of a fibre misalignment may be derived from knowing the strain level of each cross section of the wind turbine blade. This may allow to ensure a safety reserve level for each manufactured blade.

Figure 8A:
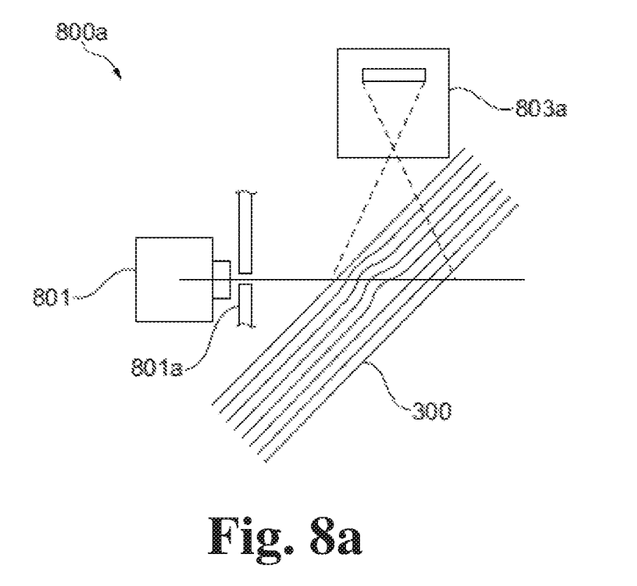
FIGS. 8a-b are diagrams illustrating exemplary fibre misalignment detection apparatuses according to embodiments of the invention.
Figure 8B:
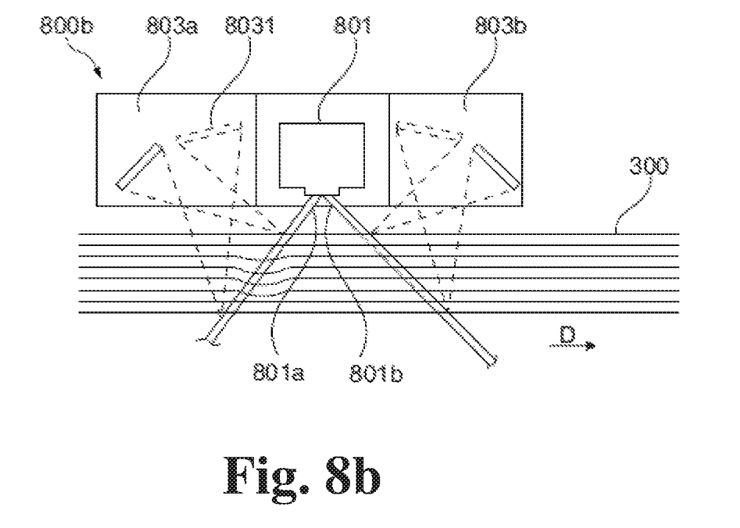

FIGS. 8a-b show diagrams illustrating exemplary fibre misalignment detection apparatuses 800a, 800b according to embodiments of the invention while scanning an elongated structure 300. The apparatus 800a, 800b is configured to slide along the elongated structure 300 e.g. in suspension. The apparatus 800a, 800b comprises an x-ray beam emitting module 801 configured to scan the elongated structure 300 along at least a part of the length by emitting an x-ray beam in an angle compared to the longitudinal direction D. The x-ray beam emitting module 801 comprises a collimator 801a in apparatus 800a and two collimators 801a-b in apparatus 800b. The collimator may be a slit collimator configured to produce or shape one or more line beams. The apparatus 800a 800b comprises an x-ray detector module, such as one backscatter detector module 803a, or two backscatter detector modules 803a 803b configured to capture the reflected or back-scattered rays. The x-ray detector module may comprise a detector collimator or pinhole. Backscattered detector module allows one side inspections of the elongated structure, i.e. the source and detector can be placed on one side of the elongated structure. This is an advantage for large and complex elongated structures. Imaging based on back-scattering measures intensity of scattered radiation which is linked with density of the elongated structure, and thus improves precision in multi-material elongated structures. The backscatter detection module 803a may comprise multiple detector sub-modules 8031.

The apparatus 800a, 800b is configured to determine or measure an intensity of the reflected or back-scattered rays and estimate a size of the fibre misalignment based on the intensity.

The apparatus 800a, 800b may be placed in a shielded box.

In an exemplary setup where the proposed technique is applicable, the setup uses a primary beam shaped by slit collimator. Such linear beam penetrates the sample and generates a scattered ray across the elongated structure thickness. The scattered rays are then projection to the x-ray detector module though a pin-hole collimator. A distance of the elongated structure from the x-ray tube emission spot is set to 5-25 cm. A distance of the pinhole is set to 5-25 cm cm. A slit width of the collimator is set 0.1-1 mm and pinhole diameter is set to 0.1-1 mm. The x-ray tube operates at 80 kV and 150 µA (power of 12 W). The typical measurement of single backscatter image of the elongated structure cross section may take 100-10000 frames with exposure time of 0.01-10 ms. The frames are analysed and spectral images are generated. The detector is operated in spectroscopic mode measuring energy of each detected X-ray photon. The resulting pattern may be formed by 2.5 million of detected photons.

The invention has been described with reference to a preferred embodiment. However, the scope of the invention is not limited to the illustrated embodiment, and alterations and modifications can be carried out without deviating from the scope of the invention.

The invention claimed is:

1. A method for detecting a fibre misalignment in an elongated structure, such as a wind turbine blade component, having a length along a longitudinal direction and comprising a plurality of stacked reinforcing fibre layers, wherein the plurality of fibre layers comprises fibres having an orientation aligned substantially unidirectionally in the longitudinal direction, wherein the method comprises the steps of:
   a) moving an x-ray beam emitting module and an x-ray detector module along at least a part of the length of the elongated structure;
   b) scanning the elongated structure along the at least a part of the length with the x-ray beam emitting module by emitting an x-ray beam therefrom at an angle with respect to the orientation of the fibres;
   c) detecting scattered rays with the x-ray detector module;
   d) determining an intensity of the detected scattered rays; and
   e) estimating a size of the fibre misalignment based on the determined intensity.

2. The method according to claim 1, wherein the angle is an angle between approx. 0.5 degrees and approx. 45 degrees with respect to a plane of the fibre layers.

3. The method according to claim 1, wherein the angle is an angle between approx. 0.5 degrees and approx. 15 degrees with respect to the plane of the fibre layers.

4. The method according to claim 1, wherein emitting the x-ray beam in the angle comprises emitting the x-ray beam through a collimator and/or emitting the x-ray beam with low power, such as 60 kW.

5. The method according to claim 1, the method further comprising scanning the elongated structure along at least a part of the length by emitting an additional x-ray beam in an additional angle.

6. The method according to claim 1, wherein estimating the size of the fibre misalignment based on the determined intensity comprises determining whether the determined intensity is above an intensity threshold, and when it is determined that the determined intensity is above an intensity threshold, then the fibre misalignment for repair is detected.

7. The method according to claim 1, the method further comprising locating the fibre misalignment within the elongated structure so as to enable repair.

8. The method according to claim 1, wherein the scanning and/or estimating takes place before and/or after an infusion phase where resin is infused on fibre material forming the elongated structure, before and/or after a curing phase.

9. The method according to claim 1, wherein the plurality of stacked reinforcing fibre layers comprises carbon fibre layers, or carbon fibre layers and glass fibre layers.

10. The method according to claim 1, wherein the plurality of stacked reinforcing fibre layers comprises carbon fibre layers with a tracer yarn.

11. The method according to claim 1, wherein the plurality of stacked reinforcing fibre layers comprises one to 60 layers.

12. The method according to claim 1, wherein the elongated structure is a wind turbine blade component, and wherein the wind turbine blade component is a load-carrying structure, such as a main laminate or a spar cap of the wind turbine blade.

13. A method of manufacturing an elongated composite structure of a fibre composite material comprising reinforcement-fibres embedded in a polymer matrix by use of a mould having a length along a longitudinal direction, wherein the method comprises the steps of:

i) stacking a plurality of fibre layers in the mould, wherein the plurality of fibre layers comprises fibres having an orientation aligned substantially unidirectionally in the longitudinal direction;
ii) supplying liquid resin to the fibre layers;
iii) curing the resin in order to provide the elongated composite structure; and
iv) detecting fibre misalignments according to the method of claim 1.

14. A fibre misalignment detection apparatus, the fibre misalignment detection apparatus comprising:
an x-ray beam emitting module configured to scan an elongated structure along at least a part of a length thereof by emitting an x-ray beam at an angle with respect to a longitudinal direction, the elongated structure comprising a plurality of fibre layers each comprising a plurality of fibres oriented substantially unidirectionally in the longitudinal direction;
an x-ray detector module configured to detect scattered rays, wherein the x-ray beam emitting module and the x-ray module are movable along the at least a part of the length of the elongated structure; and
a processing module configured to:
determine an intensity of the detected scattered rays; and
estimate a size of the fibre misalignment based on the determined intensity.

15. The fibre misalignment detection apparatus according to claim 14, wherein the x-ray beam emitting module comprises a collimator, and wherein the x-ray beam emitting module is configured to scan an elongated structure along at least a part of the length by emitting an x-ray beam in an angle compared to the longitudinal direction through the collimator.

* * * * *